United States Patent [19]

Müller-Frank et al.

[11] Patent Number: 4,476,089
[45] Date of Patent: Oct. 9, 1984

[54] HIGH TEMPERATURE REACTOR OF MODULAR CONSTRUCTION

[75] Inventors: Ulrich Müller-Frank, Bergisch Gladbach; Herbert Reutler, Cologne; Manfred Ullrich, Bergisch Gladbach, all of Fed. Rep. of Germany

[73] Assignee: GHT, Gesellschaft fuer Hochtemperaturreaktor-Technik mbH, Bergisch Gladbach, Fed. Rep. of Germany

[21] Appl. No.: 280,092

[22] Filed: Jul. 2, 1981

Related U.S. Application Data

[63] Continuation-in-part of Ser. No. 258,368, Apr. 28, 1981, abandoned.

[30] Foreign Application Priority Data

Apr. 29, 1980 [DE] Fed. Rep. of Germany ....... 3016402

[51] Int. Cl.³ .............................................. G21C 19/28
[52] U.S. Cl. .................................... 376/381; 376/262; 376/263; 376/293
[58] Field of Search ....................... 376/273, 291–296, 376/458, 260–262, 263, 380–381

[56] References Cited

U.S. PATENT DOCUMENTS

| 3,325,373 | 6/1967 | Schlicht et al. | 376/381 |
| 3,580,803 | 5/1971 | Everson et al. | 376/261 |
| 3,847,733 | 11/1974 | Ventre | 376/261 |
| 4,000,038 | 12/1976 | Moser | 376/273 |
| 4,050,984 | 9/1977 | Arndt et al. | 376/394 |
| 4,189,347 | 2/1980 | Reutler et al. | 376/459 |
| 4,234,384 | 11/1980 | Fritz et al. | 376/458 |
| 4,290,852 | 9/1981 | Fritz et al. | 376/459 |

FOREIGN PATENT DOCUMENTS

| 1148827 | 5/1963 | Fed. Rep. of Germany | 376/381 |
| 2132572 | 11/1972 | France | 376/380 |
| 2292314 | 6/1976 | France | . |
| 821607 | 10/1959 | United Kingdom | . |

Primary Examiner—Sal Cangialosi
Attorney, Agent, or Firm—Herbert L. Lerner; Laurence A. Greenberg

[57] ABSTRACT

Gas-cooled high temperature reactor asembly, including a safety container, a chamber disposed in the safety container, a reactor vessel disposed in the chamber for receiving a charge of spherical fuel elements at a given location therein, the reactor vessel being formed of blocks of at least one material from the group consisting of carbon and graphite, a steel shell surrounding the reactor vessel, a metallic base plate supporting the reactor vessel, the base plate having openings formed therein for passing cooling gas blown in the chamber into the given location for a fuel element charge, at least one downwardly extended pipeline having a connection to the base plate for discharging heated gases, the connection being detachable by axial motion of the reactor vessel, a removable cover disposed on top of the chamber, and means disposed on the reactor vessel for connecting the reactor vessel to hoisting apparatus.

7 Claims, 3 Drawing Figures

HIGH TEMPERATURE REACTOR OF MODULAR CONSTRUCTION

This application is a continuation-in-part of application Ser. No. 258,368, filed Apr. 28, 1981 now abandoned.

The invention relates to a gas-cooled high temperature reactor, in particular having a charge of spherical-shaped fuel elements, which is to be disposed in a gas and pressure-sealed chamber of a pre-stressed concrete container, or of a cast iron or steel pressure container. This reactor is intended for use as a power reactor, either for electric power generation, such as by a steam process, or for the nuclear gasification of coal. Power reactors of this type in Germany are the AVR and THTR, described in several explicit articles in the German Journal "Atomwirtschaft" of May 1966 and May 1971. The Fort Saint Vrain reactor, which also was described in several publications, may be mentioned as an example in the United States. The AVR has delivered power with high availability from its completion in the year 1967 until today. However, its thermal power of 46 MW is too low for a power reactor. The following projects endeavored to increase the thermal power of a pebble bed reactor, essentially by increasing the diameter. Several problems were therefore encountered. Pebble bed reactors with a core diameter of 6 m, for example, require absorbers which directly penetrate into the pebble or pellet bed for their reliable shut-down. Considerable forces are thereby developed in suitable corresponding absorber rods, in their drives, and also in the structures surrounding the fuel bed. Furthermore, the absorber rods themselves, and in the case of a malfunction their drives as well, are under stress due to the high temperatures created in a high temperature reactor. Furthermore, high temperature reactors with a great diameter require numerous redundant and, if possible, also diversified, active heat removal systems, which necessarily contain metallic structural elements, and therefore are also endangered by the high temperatures in the case of a malfunction. Furthermore, the side walls of a gas-cooled high temperature reactor, which are formed of graphite are highly stressed in the region of high neutron flow, and must be inspected, and, if necessary replaced, after a certain operating time. The advantage of the high temperature reactors with a large diameter planned heretofore, i.e. a core which is optimal with respect to the cost of the fuel cycle is reduced when evaluated closely by costly control and instrumentation systems, redundant and diversified shut-down devices and cooling chains for removal of the heat after shut-down. Therefore, the invention of the instant application starts out from the idea that the desired high power can also be provided by installing several smaller units in parallel. This also results in several advantages during the manufacture of the structural parts of the reactor in series, and also in the increased availability of the installation, because the shut-down of a single reactor only decreases the total power output of the installation by a fraction if several reactors are arranged in parallel. Furthermore, the investment required for the inspection and maintenance of a smaller reactor is less than for a large reactor, and is also distributed between several units. For this reason, it seems practical to construct a high temperature reactor in such a manner that it can be exchanged as a whole.

It is accordingly an object of the invention to provide a high temperature reactor of modular construction which overcomes the hereinafore-mentioned disadvantages of the heretofore-known devices of this general type, and to create a gas-cooled high temperature reactor in a gas and pressure-sealed chamber, having a core container including a base plate, reactor bottom, side reflector, and reactor ceiling which can be fastened to a lifting hoist, and can be exchanged.

With the foregoing and other objects in view there is provided, in accordance with the invention, a gas-cooled high temperature reactor assembly, comprising a safety container, a chamber disposed in the safety container, a reactor vessel disposed in the chamber for receiving a charge of spherical fuel elements at a given location therein, the reactor vessel being formed of blocks of at least one material from the group consisting of carbon and graphite, a steel shell surrounding the reactor vessel, a metallic base plate supporting the reactor vessel, the base plate having openings formed therein for passing cooling gas blown in the chamber into the given location for a fuel element charge, at least one downwardly extended pipeline having a connection to the base plate for discharging heated gases, the connection being detachable by axial motion of the reactor vessel, a removable cover disposed on top of the chamber, and means disposed on the reactor vessel for connecting the reactor vessel to hoisting apparatus. The reactor can be, as a whole, loosened from its anchor place or supports in the chamber, and after opening the chamber it can be lifted therefrom; the fuel element charge is removed from the reactor vessel prior to this operation. The cold cooling gas enters the chamber below the reactor vessel, flows from there upwardly through openings in the base plate into channel provided in the bottom, side, and ceiling reflector of the reactor, and then it flows from the top downwardly through the reactor core, where it becomes hot. Thereafter, it is conducted through inside insulated pipes through the base plate into a gas collecting chamber, and from there to a heat sink. Because the openings for the entrance and outflow of the cooling gas into and out of the reactor vessel are only positioned in the base plate, the shell is completely without perforations and connections, which had to be severed and removed before it would be possible to lift the reactor vessel out of the safety container.

Because the direction of the hot-gas channel below the baseplate is axial, i.e. it is the same as the direction in which the reactor vessel is moved when it is lifted, the connection of base plate and hot-gas line can be constructed as a plug-in connection, which can be separated simply by pulling, without the necessity of previous manipulations with remotely controlled tools. The means by which the hoisting apparatus for extracting the reactor vessel connects to the latter, need not always be in place, but can be attached only if needed. The first possibility for providing these means in the form of a flange or lugs at the upper end of the reactor vessel requires that the steel shell must be capable of carrying the whole weight. Therefore, it is more advantageous to attach the hoisting means at the base plate, which must be constructed to carry the whole weight anyway. If the hoisting means are attached at the outer edge of the base plate, this leads to a greater diameter, and thereby to an unnecessary enlargement of the chamber.

Therefore, in accordance with another feature of the invention, the reactor vessel has a wall having channels disposed therein being in communication with the openings formed in the base plate, and the connecting means includes pull rods being guided in the channels in the wall and securable or screwed to the base plate. Accordingly, the connection is between the base plate and the hoisting means within the contour of the reactor vessel.

In accordance with a further feature of the invention, the channels have upper ends and the chamber has a space formed therein above the given location for a fuel element charge, the space being in communication with the channels, and including stoppers for closing the upper ends of the channels during operation of the reactor. Therefore the cold gas which enters the reactor from the bottom upward, is conducted into the space above the fuel element bed. The desired flow direction of the coolant through the core from the top downward is therefore achieved in reactors of this type. A further advantage is that the side wall of the reactor is cooled: the lifespan of the graphite blocks serving as a side reflector and of the surrounding layer of carbon-stone or vitreous carbon blocks is increased, and the thermal stress of the steel shell is reduced. Furthermore, in the case of a malfunction in the cooling gas supply after shut-down of the reactor, a cooled reactor is capable of storing a greater part of the heat liberated from the fuel element bed.

In accordance with an added feature of the invention, there are provided control rods or absorber elements for controlling the reactor being movable in the channels during operation of the reactor. For a reactor of the hereinafore-described type with a core diameter of approximately 3 m, absorber elements which can be moved up and down in channels which are provided for this purpose in the reflector suffice for the control and shut-down of the reactor. Since the fuel elements are removed from the reactor vessel before the latter is lifted out, the absorber rods can also be removed, and their channels can be used for containing the pull-rods reaching down to the base plate, in an alternative solution to the one calling for pull rods being guided in the channels in the walls and secured to the base plate.

In accordance with an additional feature of the invention, there is provided another chamber, and heat exchangers disposed in the other chamber, the at least one pipeline being in communication with the other chamber. This provides an alternate arrangement of the reactor vessel and the heat consuming devices (such as heat exchangers for heating secondary cooling means), similar to the one provided in the construction of heretofore preferred reactors of greater power output. The second chamber is therefore accessible by itself, which has certain advantages for maintenance and repair operations, but requires a greater diameter of the whole safety container, and an increased requirement for the hot-gas piping.

Alternatively, in accordance with again another feature of the invention, there are provided heat exchangers disposed in the chamber below the reactor vessel, the at least one pipeline being in communication with the heat exchanger. This simplifies the gas conduction, and thereby results in a space saving construction, except that, however, the accessibility of the heat exchangers is more limited. In this case, the reactor vessel and the heat exchanger can be arranged on top of each other in a steel pressure container, as is known and has proven itself for the use of pressurized water reactors.

In accordance with a concomitant feature of the invention, there are provided means for conducting cooling gas to the base plate and to the at least one pipeline. These special piping devices for conducting the cold gas serve for better cooling of the base plate, of the shell, of the inside insulated hot-gas lines, and for the direct or aimed supply of the cooling gas to the entrance openings provided in the base plate.

Other features which are considered as characteristic for the invention are set forth in the appended claims.

Although the invention is illustrated and described herein as embodied in a high temperature reactor of modular construction, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
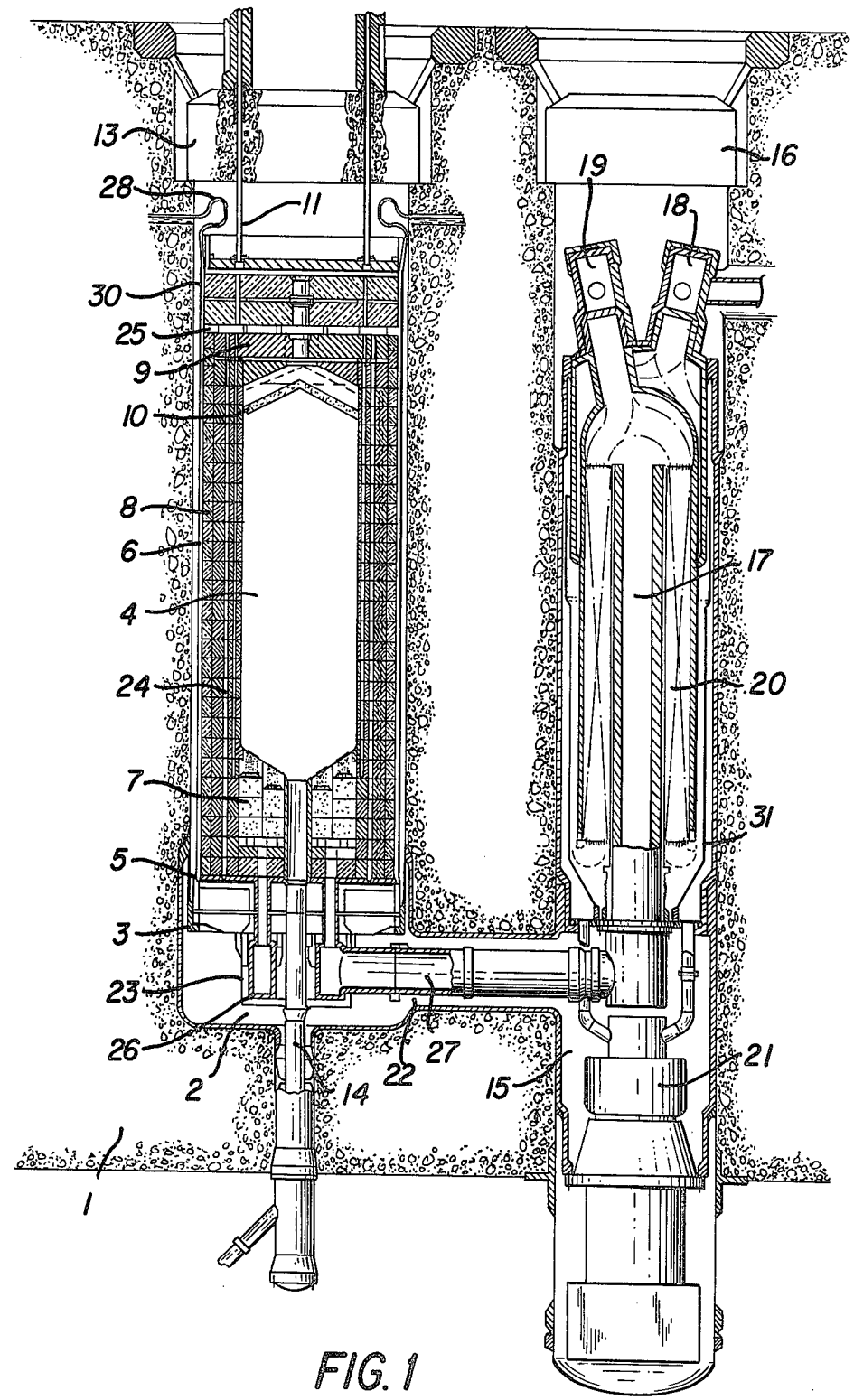
FIG. 1 is a fragmentary, diagrammatic cross-sectional view of a first embodiment of the invention in the operating state.

Referring now to the figures of the drawing and first particularly to FIG. 1 thereof, it is seen that a first chamber 2 is disposed in a safety container 1 (in this case made of concrete). A reactor vessel 4 supported on a support ring 3 is disposed in the chamber 2. The ring 3 basically includes a metallic base-plate 5, metallic shell or mantle 6, a bottom 7, a side reflector 8, and a ceiling-reflector 9. The last three mentioned parts are constructed only of graphite blocks with an outer layer of carbon-stone or vitreous carbon; these parts are capable of withstanding the high temperatures occuring during a possible failure by virtue of not being made of metal. The reactor vessel 4 contains a charge or fill 10 of spherical-shaped fuel elements, the reactivity of which is controlled by control rods 11, that can be moved up-and down for this purpose in channels provided in the side reflector 8 by means of driver devices which are not shown in the drawing. The driver devices can be arranged above a cover 13, which closes the first chamber 2 toward the top. Spent fuel elements are withdrawn by a tube 14. The representation of a suitable feeding device for new fuel elements at the upper end of the reactor vessel 4 has been omitted for better clarity. A second steam generator 17 is disposed in a second chamber 15, which is also closed by a cover 16. The cooling gas which was heated in the fuel-element charge 10 gives off its heat in the steam generator 17. The steam generator is of a conventional construction, with a water entrance port 18, a steam outlet 19, and tube bundles 20 arranged therebetween, as well as an apron 31 designed to conduct cool gas from the lower end of the tube bundles to the upper, heat-loaded part of shell, so that there is no reason to describe it further. The circulation of the cooling gas is maintained by a blower 21 which is arranged below the steam generator 17. The way in which the gas is conducted in the first chamber 2 therefore deserves special attention.

The cooling gas is conducted through a connecting channel 22 from the second chamber 15 through conducting means 23 directly to the base plate 5, so that the base plate 5 is not exposed to any temperature which is not permissible for metallic materials. There are openings formed in the base plate 5 which are aligned with cooling channels 24 in the side reflector 8. In these cooling channels, which serve to limit the temperature in the side reflector, the gas is conducted to a collector chamber 25 above the ceiling-reflector, and from there it flows downward through the fuel element charge or bed 10. In the charge 10, the gas is heated, it leaves the reactor vessel 4 through openings in the bottom 7, and collects in a collector space 26. A hot-gas line 27 leading to the steam-generator 17 is connected to the collector space 26. The connection between the collecting-space 26 and the hot-gas line 27 can be interrupted by remote control means or tools. Several U-shaped cooling lines 28 only shown from the side in FIG. 1 which are distributed around the circumference, serve for cooling the shell 6 during normal operation, and for the removal of (after) heat when the reactor is shut down, and the blower 21 is not operating. The base plate 5 and shell 6 are in a fixed connection with each other, and for example, are fastened to the support ring 3 by screws 29, which also can be removed with the aid of remote control tools. The cooling channels 24 are closed at their upper end by stoppers 30.

Figure 2:
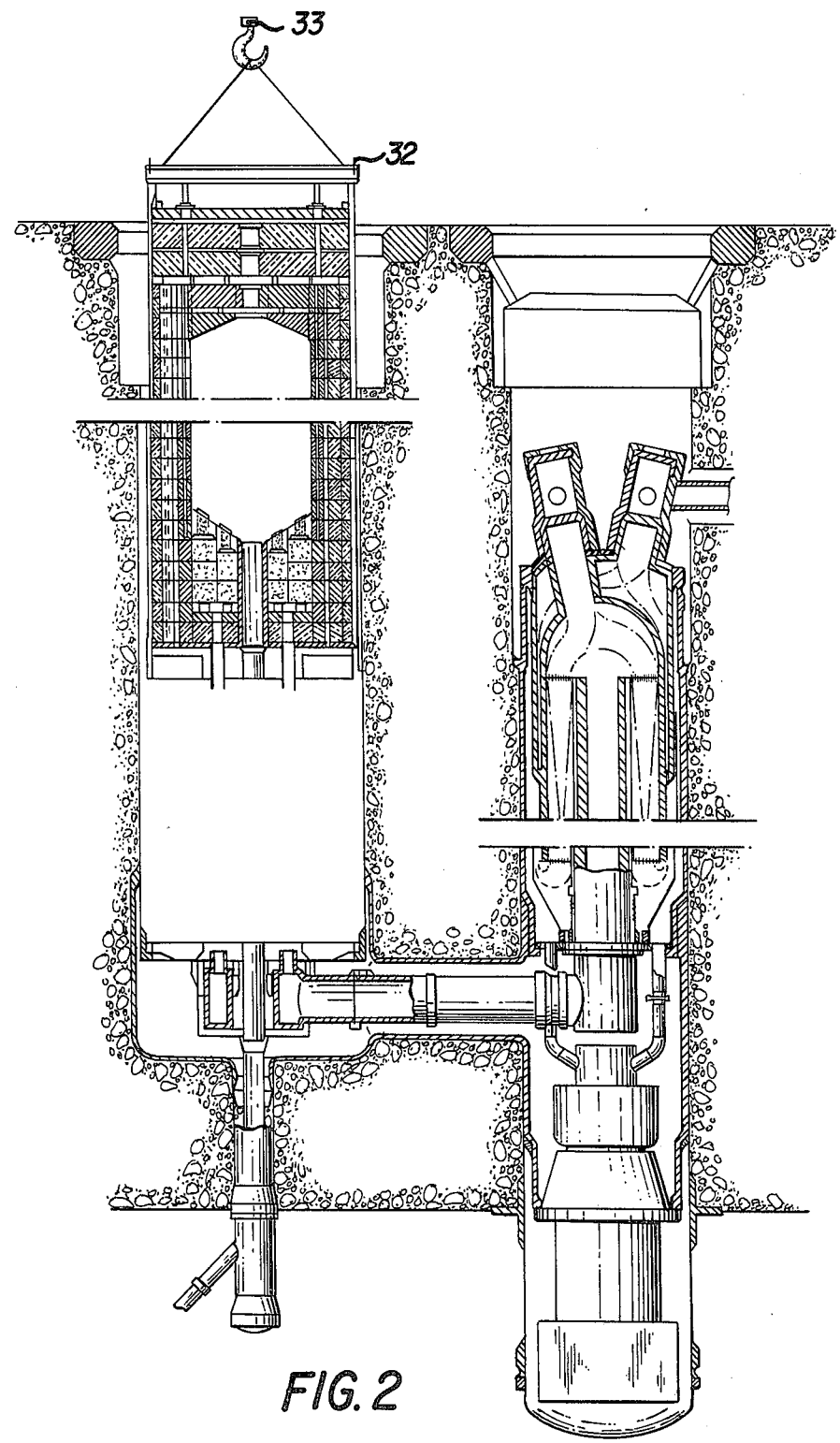
FIG. 2 is a view similar to FIG. 1 of the same embodiment of the invention during installation.

FIG. 2 shows the condition of the installation after the reactor has been shut down with the control rods 11, and the fuel element charge 10 has been removed through the withdrawal 14 after suitable attenuation or dying out. After shut down the cover 13 was removed including the control drives disposed upon it. The cooling lines 28 were separated at a suitable non-illustrated place. The stoppers 30 were also removed, and pull-rods secured to a traverse girder 32 were inserted into the cooling channels 24 which were anchored at their lower end in the base plate 5. In this condition, the reactor vessel 4 can be lifted out of the chamber 2 for repair and maintenance purposes by means of a hoist 33 which is just barely indicated in the drawing. The push-in connection between the base plate 5 and its short pipes and the collector space 26 is therefore simultaneously disconnected.

Figure 3:
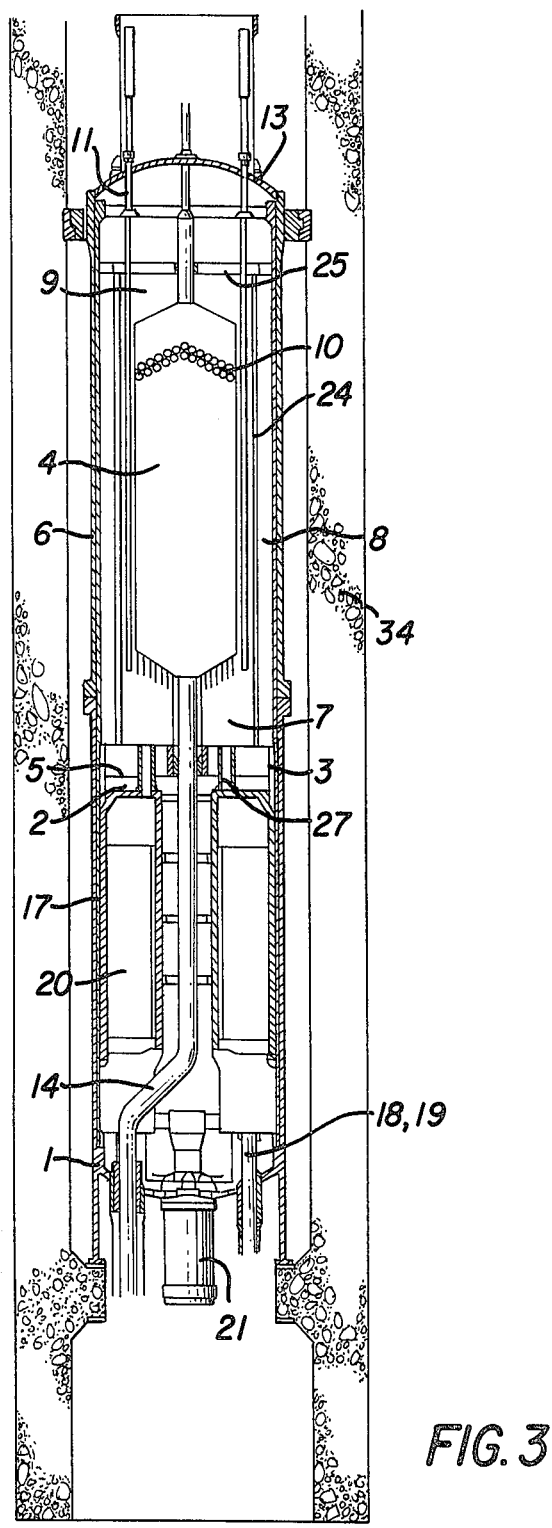
FIG. 3 is a fragmentary, diagrammatic cross-sectional view of a second embodiment of the invention.

FIG. 3 shows an alternative construction, wherein the parts having functions that coincide with those shown in FIGS. 1 and 2 have the same reference numerals. A pressure tank of steel serves in the FIG. 3 embodiment as the safety container 1, as is used in a similar manner for light-water cooled nuclear reactors. An additional shield 34 of concrete is required in this case. The reactor and the heat exchanger are disposed on top of each other, so that a second chamber is not required. The hot gas enters into the heat exchanger 17 in this embodiment through very short pipes 27, so that the heat exchanger surrounds the fuel element exhaust tube 14 in a ring-shape. An additional annular chamber is provided in this embodiment between the two, through which the cooled gas flows into the space which serves the function of the chamber 2. From there on the gas takes its path through the reactor as described above. In FIG. 3 as well, the connections between the hot-gas line 27 and the heat exchanger 17 are constructed as plug-in connections. After removing the cover 13, the shut-down and emptied reactor can be lifted from the safety container 1 in the same manner described above.

There is claimed:

1. Gas-cooled high temperature reactor assembly, comprising a safety container, a chamber disposed in said safety container, a reactor vessel disposed in said chamber for receiving a nuclear reactor with reaction control means and a charge of spherical fuel elements at a given location therein, said reactor vessel being formed of blocks of at least one material from the group consisting of carbon and graphite, a steel shell surrounding said reactor vessel, a metallic base plate supporting said reactor vessel, said base plate having openings formed therein for passing cooling gas blown in said chamber into said given location for a fuel element charge, at least one downwardly extended pipeline having a connection to said base plate for discharging heated gases, said connection being detachable by axial motion of said reactor vessel in one piece with said base plate, a removable cover disposed on top of said chamber, and means disposed on said reactor vessel for connecting said reactor vessel to hoisting apparatus.

2. Reactor assembly according to claim 1, wherein said reactor vessel has a wall having channels disposed therein being in communication with said openings formed in said base plate, and said connecting means includes pull rods being guided in said channels in said wall and securable to said base plate.

3. Reactor assembly according to claim 2, wherein said channels have upper ends and said chamber has a space formed therein above said given location for a fuel element charge, said space being in communication with said channels, and including stoppers for closing said upper ends of said channels during operation of the reactor.

4. Reactor assembly according to claim 2, including absorber elements for controlling the reactor being movable in said channels during operation of the reactor.

5. Reactor assembly according to claim 1, including another chamber, and heat exchangers disposed in said other chamber, said at least one pipeline being in communication with said other chamber.

6. Reactor assembly according to claim 1, including heat exchangers disposed in said chamber below said reactor vessel, said at least one pipeline being in communication with said heat exchangers.

7. Reactor assembly according to claim 1, including means for conducting cooling gas to said base plate and to said at least one pipeline.

\* \* \* \* \*